(12) United States Patent
Greenberg et al.

(10) Patent No.: US 6,319,328 B1
(45) Date of Patent: Nov. 20, 2001

(54) SOIL AND/OR GROUNDWATER REMEDIATION PROCESS

(76) Inventors: Richard S. Greenberg, H-10 Erli Rd., FairLawn, NJ (US) 07410; Thomas Andrews, 3 Garden La., Whitehouse Station, NJ (US) 08889

( * ) Notice: Subject to any disclaimer, the term of this patent is extended or adjusted under 35 U.S.C. 154(b) by 0 days.

(21) Appl. No.: 09/345,922

(22) Filed: Jul. 1, 1999

(51) Int. Cl.$^7$ ........................................ B08B 3/00
(52) U.S. Cl. ..................... 134/2; 134/3; 134/10; 134/25.1; 134/26
(58) Field of Search ..................... 134/2, 3, 10, 25.1, 134/26, 18

(56) References Cited

U.S. PATENT DOCUMENTS

| | | | | |
|---|---|---|---|---|
| 5,741,427 | * | 4/1998 | Watts et al. ........................ | 210/747 |
| 5,755,977 | * | 5/1998 | Gurol et al. ........................ | 210/759 |
| 5,789,649 | * | 8/1998 | Batchelor et al. ................... | 588/206 |

* cited by examiner

*Primary Examiner*—Zeinab El-Arini
(74) *Attorney, Agent, or Firm*—Watov & Kipnes, P.C.

(57) ABSTRACT

A method of treating contaminants in soil and/or groundwater including adding a source of an oxidizing agent and an aqueous solution of a metal catalyst having a pH of from about 5 to 8 to the in situ environment in amounts capable of producing reactive species sufficient to oxidize at least one of the contaminants.

31 Claims, No Drawings

SOIL AND/OR GROUNDWATER REMEDIATION PROCESS

FIELD OF THE INVENTION

The present invention is directed to methods and systems for converting contaminants contained in soil and/or groundwater to non-contaminating or harmless compounds. The methods and systems include treatment of the contaminants with a source of an oxidizing agent and a substantially neutral reagent comprising an effective amount of a metal catalyst to thereby promote and control the conversion of the contaminants.

BACKGROUND OF THE INVENTION

The treatment of contaminated soils and groundwater has gained increased attention over the past few years because of uncontrolled hazardous waste disposal sites. It is well documented that the most common means of site remediation has been excavation and landfill disposal. While these procedures remove contaminants, they are extremely costly and in some cases difficult if not impossible to perform.

More recently, research has focused on the conversion of contaminants contained in soil and groundwater based on the development of on-site and in situ treatment technologies. One such treatment has been the incineration of contaminated soils. The disadvantage of this system is in the possible formation of harmful by products including polychlorinated dibenzo-p-dioxins (PCDD) and polychlorinated dibenzofurans (PCDF).

In situ biological soil treatment and groundwater treatment is another such system that has been reviewed in recent years. So-called bioremediation systems, however, have limited utility for treating waste components that are biorefractory or toxic to microorganisms.

Such bioremediation systems were the first to investigate the practical and efficient injection of hydrogen peroxide into groundwater and/or soils. These investigations revealed that the overriding issue affecting the use of hydrogen peroxide in situ was the instability of the hydrogen peroxide downgradient from the injection point. The presence of minerals and enzymes such as catalase and peroxidase in the subsurface catalyzed the disproportionation of hydrogen peroxide near the injection point, with rapid evolution and loss of molecular oxygen, leading to the investigation of stabilizers as well as biological nutrients.

During the early biological studies from the 1980's, some investigators recognized the potential for competing reactions, such as the direct oxidation of the substrate by hydrogen peroxide. Certain researchers also hypothesized that an unwanted in situ Fenton's-like reaction under native conditions in the soil was reducing yields of oxygen through the production of hydroxyl radicals. Such a mechanism of contaminant reduction was not unexpected, since Fenton's-type systems have been used in ex situ systems to treat soil and groundwater contamination.

Other investigators concomitantly extended the use of Fenton's-type systems to the remediation of in situ soil systems. These studies attempted to correlate variable parameters such as hydrogen peroxide, iron, phosphate, pH, and temperature with the efficiency of remediation.

As with the bioremedial systems, in situ Fenton's systems were often limited by instability of the hydrogen peroxide in situ and by the lack of spatial and temporal control in the formation of the oxidizing agent (i.e. hydroxyl radical) from the hydrogen peroxide. In particular, aggressive/violent reactions often occurred at or near the point where the source of the oxidizing agent (the hydrogen peroxide) and the catalyst were injected. As a consequence, a significant amount of reagents including the source of the oxidizing agent (hydrogen peroxide) was wasted because activity was confined to a very limited area around the injection point. In addition, these in situ Fenton's systems often required the aggressive adjustment of groundwater pH to acidic conditions, which is not desirable in a minimally invasive treatment system. Finally, such systems also resulted in the mineralization of the subsurface, resulting in impermeable soil and groundwater phases due to the deleterious effects of the reagents on the subsurface soils.

U.S. Pat. No. 5,741,427 describes the complexing of a ligand donor with a metal catalyst to moderate the catalytic turnover rate of the metal catalyst. It is indicated that the preferred metal catalysts include metal salts, iron oxyhydroxides, iron chelates, manganese oxyhydroxides and combinations thereof, and the ligand donors generally comprise acids, salts of acids, and combinations thereof. The described reaction product complex of the metal catalyst and ligand donor moderates the catalytic turnover rate for a longer time and for a further distance from the injection point to provide enhanced spatial and temporal control in the formation of the oxidizing agent (i.e hydroxyl radical). Although the system described in the '427 Patent works well, the reaction product complex is highly acidic with a pH in the range of 2 to 4, which is undesirable from the standpoint of proper environmental remediation as well as regulatory review.

Other researchers have investigated the use of ozone, either alone or in combination with hydrogen peroxide, in ex situ advanced oxidation processes (AOPs). These systems suffer from a similar limitation as the ex situ Fenton's systems; namely, the necessity to pump contaminants from the in situ media to an external reaction vessel, a requirement which was both expensive and inefficient. Ozonation processes also suffer from low selectivity of contaminant destruction and high instability of the ozone and reactive species generated.

It would be of significant advantage in the art of removing contaminants from soil and/or groundwater to provide a system by which the source of the oxidizing agent and the metal catalyst can travel from the injection point throughout the aerial extent of the contamination in order to promote efficient destruction of the contaminant plume without the acidification of the subsurface or the resultant mineralization of the soils. It would be a further advantage to provide a system by which the source of the oxidizing agent is stabilized to allow dispersion throughout the plume and by which the catalytic turnover rate of the metal catalyst is moderated in order to promote more efficient destruction of contaminants. It would be of further benefit to provide an injection method in which the reagents are injected at the time, concentration, and location most suitable for efficient conversion of the contaminants at the specific site. It would be a still further benefit in the art to provide a system which efficiently generates the reactive species, for example hydoxyl radicals, to provide a cost efficient and effective method of oxidizing contaminants in soil and/or groundwater.

SUMMARY OF THE INVENTION

The present invention is directed to reagents and methods for treating contaminants in an in situ environment in which an oxidizing agent and a reagent comprising an aqueous solution containing an effective amount of a metal catalyst having a pH in the range of about 5 to 8, is provided to the in situ environment to thereby reduce or eliminate contaminants present therein in a simple, cost efficient and effective manner without significantly altering or disturbing the natural features of the environment.

In accordance with one aspect of the invention, there is provided a method of treating contaminants in an in situ environment comprising adding a source of an oxidizing agent, preferably a stabilized source of oxidizing agent, capable of oxidizing at least one of the contaminants and together or separately with an effective amount of a reagent comprising an aqueous solution of a metal catalyst having a pH in the range of about 5 to 8 or adjusted to a pH of 5 to 8 with a pH modifying agent, to the in situ environment to at least reduce the concentration of at least one contaminant in the in situ environment. Use of the source of the oxidizing agent and the catalytic reagent enables temporal and spatial control of the oxidation process so that the oxidizing agent is able to be generated into areas where contaminants are present. As a result, aggressive/violent reactions at the point of injection are minimized and less oxidizing agent is wasted. In addition, due to the generation of hydroxyl radicals throughout the plume and the presence of other reactive species, contaminants normally recalcitrant to other advanced oxidation processes are now able to convert to harmless byproducts. The present method is applicable to all areas of the in situ environment especially subsurface areas.

In accordance with a further aspect of the invention, the stabilized oxidizing agent and the catalytic reagent are injected into a specific area of the in situ environment known as the capillary fringe. The capillary fringe is that portion of the contamination at a site which lies just above the water table. Destruction of contamination in the capillary fringe prevents contamination which is often adsorbed in the capillary fringe from serving as a continuing source of groundwater and soil contamination.

In accordance with another aspect of the invention, the stabilized source of the oxidizing agent and the catalytic reagent are injected into an area of the subsurface environment known as the saturated unconsolidated zone. The saturated unconsolidated zone is that portion of the contamination at a site which lies within the water table. Destruction of contaminants in the saturated unconsolidated zone prevents contamination which is often adsorbed in the water table from serving as a continuing source of groundwater and soil contamination.

In accordance with another aspect of the invention, the methods and systems herein can be applied to oxidizing contaminants in formations which are difficult to access such as fractured bedrock. In particular, the source of the oxidizing agent and the catalytic reagent are injected at elevated pressures into the fractured bedrock to treat contaminants whose density is greater than water and are often trapped in bedrock fractures.

In further aspect of the invention, the source of the oxidizing agent and the catalytic reagent are injected into an situ environment to enhance the operation and efficiency of traditional remediation technologies such as pump and treat and soil vapor extraction systems. The present invention enhances these conventional systems that are based on mechanical removal of the contaminants. This is because the oxidation reactions which convert the contaminants to harmless compounds also enhance desorption of the contaminants from organic carbon in soil and/or groundwater and generally result in enhanced volatilization and reduced adsorption to organic carbon in the soil.

DETAILED DESCRIPTION OF THE INVENTION

The present invention is generally directed to methods and systems for removing contaminants from soil and/or groundwater by converting the same to harmless by-products. Such contaminants typically arise from petroleum storage tank spills or from intentional or accidental discharge of liquid hydrocarbons including, but not limited to: gasoline, fuel oils, benzene, toluene, ethylbenzene, xylenes, (BTEX) naphthalene, pesticides, herbicides, and other organic compounds; lubricants, chlorinated solvents, including polychorinated biphenyls (PCBs), and pentachlorophenol (PCP); and metals, cyanides, and the like. The list of contaminants provided herein is exemplary. It should be understood, however, that other contaminants capable of being oxidized into harmless compounds, such as carbon dioxide and water, is within the purview of the present invention.

In accordance with the present invention, the methods and systems for remediation of a contaminated environment in situ is performed by providing a reagent comprising an aqueous solution containing an effective amount of a metal catalyst having a pH in the range of from about 5 to 8, and injecting the same along with a stabilized source of an oxidizing agent, such as a peroxide and preferably hydrogen peroxide, as hereinafter described. The source of the oxidizing agent and the catalytic reagent reacts in situ to form a reactive species (e.g. hydoxyl radical), as hereinafter described. It has been found that the reactive species generated in this way are found throughout the extent of the plume with a resultant higher efficiency of contaminant destruction. Neutralizing the pH of the catalytic reagent within the range of from about 5 to 8 moderates the catalytic turnover rate of the metal catalyst.

In one embodiment of the present invention, the catalytic reagent and the stabilized source of the oxidizing agent are alternately injected (i.e. in cycles) into the soil and/or groundwater. The procedure is typically adopted for a subsurface with moderate to high permeability. In another embodiment of the present invention, the catalytic reagent and the stabilized source of the oxidizing agent are continuously injected into the soil and/or groundwater. This procedure is typically adopted for a subsurface with low to moderate permeability. In a preferred procedure employing cycled or continuous reagent application, the catalytic reagent is the first injection in the soil and/or groundwater followed by the stabilized source of the oxidizing agent. In another preferred procedure employing cycled or continuous reagent application, the stabilized source of the oxidizing agent is the first injection in the soil and/or groundwater followed by the catalytic reagent. In still another preferred procedure consisting of continuous reagent application, the stabilized source of the oxidizing agent is added to the in situ environment and allowed to disperse or migrate throughout the plume. Subsequently, the catalytic reagent is injected into the in situ environment in at least one injection point through the plume. Applicants have determined that the substantially pH neutral catalytic reagent provides better dispersion of reagents in the subsurface and more control over the formation of the oxidizing agent.

In particular, the present catalytic reagent moderates the catalytic turnover rate for a longer time and for a further distance from the injection point than typical prior art procedures to provide enhanced spatial and temporal control in the formation of the oxidizing agent. The oxidation efficiency of the reagent of the present invention is therefore superior to prior art systems. Although not wishing to be bound by any theory, it is believed that the pH level of the catalytic reagent promotes a more moderate rate of turnover of the catalytic system thereby harnessing its ability to promote the production of the oxidizing agent significant distances away from the injection point.

The sources of oxidizing agents employed in the present invention are those that typically generate free radicals (e.g. hydroxyl radicals) and include peroxides such as hydrogen peroxide, calcium peroxide, sodium peroxide, and permanganates such as potassium permanganate and the like. Calcium peroxide generates hydroxyl radicals under acidic conditions in the presence of iron (II) salts. Calcium peroxide is very slightly soluble in water and is generally more expensive than hydrogen peroxide. However, calcium peroxide can be used as an effective source of oxidizing agent for hydrocarbon-contaminated sites. Sodium peroxide has been found to behave in a manner similar to calcium peroxide and can be used as well. Hydrogen peroxide is the preferred peroxide for use in the present invention.

Another suitable source of the oxidizing agent is ozone. Ozone has previously been used as a disinfectant and in more recent applications to oxidize refractory organic contaminants. Ozone under well known conditions can generate hydroxyl radicals which is a preferred oxidizing agent.

The peroxides and ozone, as exemplary hydroxyl radical producing compounds, can be used alone, in combination with themselves (i.e. ozone-peroxide) or in combination with ultraviolet radiation. What is essential is that the source of the oxidizing agent be capable of generating hydroxyl radicals in sufficient quantity to convert existing contaminants (e.g. hydrocarbons) to harmless compounds (e.g. carbon dioxide and water vapor).

Prior to injection, the source of the oxidizing agent (e.g. peroxide) is preferably stabilized. Stabilization prevents the immediate conversion of the peroxide via native iron or catalase into hydroxyl radicals or oxygen at positions only immediately adjacent to the injection points. Once stabilized, the peroxide is introduced into the in situ environment, typically in water at a concentration up to about 35% by weight. It will be understood that the concentration of peroxide in the in situ environment will significantly decrease as the peroxide spreads out through the soil and/or groundwater. In a preferred form of injection into the in situ environment, stabilized peroxide is used at a concentration less than 10%. Suitable stabilizers include acids and salts thereof. The most preferred acid is phosphoric acid and the most preferred salt is monopotassium phosphate.

The catalytic reagent employed in the present invention is obtained by mixing an effective amount of the metal catalyst in water at ambient temperature to enhance dissolution so that the aqueous solution of the metal catalyst has a pH of from about 5 to 8. If necessary, the resulting solution may be neutralized with a pH modifying agent to a pH within the range of from about 5 to 8. Suitable catalysts include metal salts, iron oxyhydroxides, iron chelates, manganese oxyhydroxides and combinations thereof. Preferred metal salts include iron (II) and (III) salts, copper (II) salts and manganese (II) salts. Preferred iron salts are selected from the group consisting of ferrous sulfate, ferric sulfate, ferrous perchlorate, ferric perchlorate, ferrous nitrate and ferric nitrate.

Preferred iron oxyhydroxides include goethite, hematite and magnetite. Iron chelates include, for example, Fe(II/III)-EDTA, Fe(II/III)-NTA, Fe(II/III)-hydroxyethyliminodiacetic acid (HEIDA), Fe(II/III)-mucic acid, Fe(II/III)-malonic acid, Fe(II/III)-ketomalonic acid, Fe(II/III)-DL-tartaric acid, Fe(II/III)-citric acid, Fe(II/III)-oxalic acid, Fe(II/III)-gallic acid, Fe(II/III)-picolinic acid, Fe(II/III)-dipicolinic acid, Fe(II/III)-catechol, Fe(II/III)-1,2-dihydroxybenzoic acid, Fe(II/III)-quercertin, Fe(II/III)-pyrocatechol violet, Fe(II/III)-alizarin red, Fe(II/III)-rhodizonic acid, Fe(II/III)-tetrahydroxy-1,4-quinone, Fe(II/III)-ascorbic acid, and Fe(II/III)-hexaketocyclohexane (HKCH). The most preferred catalyst is iron sulfate or Fe(II/III) EDTA.

pH modifying agents include strong bases such as alkali metal hydroxides (e.g. sodium hydroxide) and weak bases such as salts of weak acids (e.g. sodium acetate and sodium carbonate).

The in situ environment for most soil and/or groundwater sites includes a water table which is the uppermost level of the below-ground, geological formation that is saturated with water. Water pressure in the pores of the soil or rock is equal to atmospheric pressure. Above the water table is the unsaturated zone or vadose region comprising the upper layers of soil in which pore spaces or rock are filled with air or water at less than atmospheric pressure. The capillary fringe is that portion of the vadose region which lies just above the water table.

The capillary fringe is formed by contact between the water table and the dry porous material constituting the vadose region. The water from the water table rises into the dry porous material due to surface tension because of an unbalanced molecular attraction of the water at the boundary, thus forming the capillary fringe. The capillary fringe houses the majority of the light non-aqueous phase liquid contamination (LNAPLs) having a density less than water (e.g. BTEX contamination) due to the LNAPLs tendency to remain on the surface of the water table. Seasonal changes in water table elevation may deposit additional contamination in the capillary fringe and/or recontaminate the water table with contamination from the capillary fringe.

The source of the oxidizing agent and the substantially pH neutralized catalytic reagent can be administered to the in situ environment by any method considered conventional in the art. For example, administration can be directly into the groundwater through a horizontal or vertical well or into subterranean soil through a well or infiltration trenches at or near the site of contamination. In a preferred form of the present invention, the capillary fringe constitutes the in situ environment for treatment of the majority of contaminants that are less dense than water. The stabilized source of the oxidizing agent and catalytic reagent are administered into the capillary fringe of the contaminated site through wells or trenches and the like.

Contamination that is denser than water (i.e. Dense non aqueous phase liquids or DNAPLs) mostly resides at or near the bottom of the saturated zone due to its tendency to sink in water (e.g. chlorinated solvents). In a preferred form of the present invention, the saturated zone constitutes the in situ environment for treatment of the majority of contaminants that are denser than water. The stabilized source of the oxidizing agent and catalytic reagent are administered into the bottom layers of the saturated zone through wells or trenches and the like.

The saturation depth or depth of the saturated zone is very high at some contaminated sites (greater than 20–50 feet). Treatment of contamination in the saturated zone at such sites is achieved by varying the depth at which the stabilized source of the oxidizing agent and catalytic reagent are administered. Typically, injection wells with adjustable depth injectors are utilized at sites with high saturation depth. In a preferred form of the invention, the depth variation is performed after each treatment cycle in increments varying from 5–10 feet.

As previously indicated, the reagents of the present invention can be administered under elevated pressures into hard to reach places such as fractures within underlying bedrock. These fractures are collecting places for contaminants which are typically more dense than water. When administered the present reagents are able to penetrate the fractures, contact the contaminants and convert the same to harmless compounds.

Injection of the stabilized source of the oxidizing agent and the catalytic reagent can be accomplished by installing steel lined wells or open hole type wells into the bedrock. Packers and bladders conventionally employed in downhole drilling can be employed to assist in isolating discrete fractures and accessing the contaminants with the reagents. The reagents are then injected into the fractures at applied elevated pressures, typically in the range of from about 20 to 100 psi.

The administration of the present reagents into the in situ environment including bedrock fractures under elevated pressures can be accomplished either alone or in conjunction with conventional treatment systems. Such systems include pump and treat systems which pump the contaminated groundwater out of the in situ environment and soil vapor extraction systems in which a vacuum is applied to the site of contamination to physically enhance volatilization and desorption of the contaminants from soil and/or groundwater.

The use of the metal catalyst reagent as a promoter for the formation of the oxidizing agent is advantageous because the reagent can be easily generated by readily available mixers which do not require excessive labor to operate. In addition, unlike conventional Fenton's systems which are highly dependent on pH and require aggressive adjustment of site pH to acidic conditions, it has been found that the present system functions efficiently at substantially neutral pH ranges, consistent with native pH found in many subsurface environments.

As indicated above, the stabilized source of the oxidizing agent and the metal catalyst reagent can be administered directly into the in situ environment. In a preferred form of the invention, the amount of the reagents and the number of treatment cycles are predetermined. For example, samples of the contaminated soil and/or groundwater are taken and the concentrations of the respective reagents required for in situ treatment are then determined based on the amount of the reagents needed to at least substantially rid the samples of the contaminants contained therein.

More specifically, a sample of the soil and/or groundwater is analyzed to determine the concentration of the contaminants of interest (e.g. hydrocarbons). Analysis of volatile hydrocarbons can be made by gas chromatographic/mass spectrometric systems which follow, for example, EPA Method 624 for aqueous samples and EPA Method 8260 for soil samples. Semi-volatiles are analyzed in a similar manner according to, for example, EPA Method 625 for aqueous samples and EPA Method 8270 for soil samples.

Results from these analyses are used to determine the reagent combinations for treatment of the sample based on the type and concentration of the contaminants. A specific molar ratio of the reagents is used for the sample based on prior research, comparative samples and the like. Typical sample weights can be in the range of from about 120 to 150 grams.

Sample analysis is also employed to determine the number of treatment cycles which may be necessary to achieve the desired reduction in the level of contaminants. While one treatment cycle may be used, it is often desirable to employ a plurality of treatment cycles depending on the type and concentration of pollutants. The number of treatment cycles is determined in part by monitoring the performance of the reagents, particularly the source of the oxidizing agent once injected into the soil and/or groundwater.

In operation, a catalyst such as a chelated iron (II) salt is premixed with water and optionally, if necessary, titrated with a pH adjusting agent such as a base (e.g. sodium hydroxide) within a pH range of from about 5 to 8. The metal catalyst reagent comprised of the catalyst, and the stabilized source of the oxidizing agent are injected into sealed vials with a syringe. The reagent doses are given as specific treatment cycles with the expectation that the samples will typically require as few as one treatment cycle and as many as five treatment cycles in order to substantially or completely convert the contaminants to harmless by-products. Each additional treatment cycle is given after ensuring that greater than 75% of source of the oxidizing agent injected to that point has been consumed.

A control sample is set up for each type of sample undergoing the study to correct for any volatilization loss. All experimental vials are left undisturbed overnight at room temperature. On the following day the samples are analyzed to determine the concentration of contaminants by the above-mentioned EPA procedure. Once the results are obtained, they may be extrapolated to provide a suitable amount of the stabilized source of the oxidizing agent and metal catalyst reagent necessary to treat the contaminants in situ.

Injection of the stabilized source of the oxidizing agent and metal catalyst reagent may be performed under both applied and hydrostatic pressure into the in situ environment. Flow rates will vary depending on the subsurface soil characteristics with faster rates associated with more highly permeable soils (e.g. gravel and/or sand). Slower rates as low as 0.01 gallons per minute may be used for less permeable soils (e.g. clays and/or silts). The stabilized source of the oxidizing agent and metal catalyst reagent may be injected into the subsurface and allowed to disperse over a period of time necessary to achieve equalization such as about 24 hours. The equalization period may vary depending, in part, on the soil type.

In less permeable soils, injection procedures are preferably associated with a pressurized system. A typical system involves injection wells installed with screens set at specific levels to allow for higher pressures encountered by pumping into less permeable soils. The pumping system can include a low horsepower pump at pressures ranging from between about 10 and 40 lbs. per square inch. The stabilized source of the oxidizing agent and catalytic reagent may be pumped in short pulse injections or in a long steady flow as desired. In another form of the invention, the injection efficiency into less permeable soils is improved by subjecting the less permeable areas to hydraulic fracturing or other techniques to create fissures within the subsurface that render the in situ environment more permeable.

In a preferred form of the invention applicable for most contaminants that are less dense than water, the stabilized source of the oxidizing agent and metal catalyst reagent are injected directly into the capillary fringe, located just above the water table. This can be accomplished in a conventional manner by installing a well screened in the capillary fringe and injecting the reagents into the well screen.

In another preferred form of the invention applicable for contaminants that are denser than water, the stabilized source of the oxidizing agent and the catalytic reagent are administered into the lower layer of the saturated zone. This can be accomplished by installing a well screened through the bottom portion of the saturated zone and extending the associated injectors to the bottom of the aquifer.

As previously indicated, the stabilized source of the oxidizing agent and the catalytic reagent are alternately injected (i.e. in cycles) into the in situ environment. In another embodiment, the stabilized source of the oxidizing agent and the catalytic reagent are continuously injected into the in situ environment.

In particular, the effects of naturally occurring minerals including their reactivity with the peroxide and metal catalyst can have a dramatic effect on the extent of the formation of the oxidizing agent. Typically, it has been found that continuous injection of stabilized source of oxidizer and the catalytic reagent into in situ environment with low to moderate permeability and cycled injection into in situ environment with moderate to high permeability allows for improved efficiency of conversion of reactive species throughout the plume in the subsurface.

What is claimed is:

1. A method of treating contaminants in an in situ environment, comprising the steps of:
   preparing an aqueous catalyst solution comprising an effective amount of a metal catalyst selected from at least one member of the group consisting of Fe (II) salts, Fe (III) salts, Fe (II) chelates, Fe (III) chelates and combinations thereof;
   maintaining said aqueous catalyst solution at a pH of from about 5 to 8;
   adding a source of an oxidizing agent to said in situ environment in an amount sufficient to treat said contaminants; and
   adding said aqueous catalyst solution to said in situ environment in the presence of said source of the oxidizing agent in an amount sufficient to promote the formation of the oxidizing agent in an amount sufficient to treat said contaminants.

2. The method of claim 1 wherein said source of the oxidizing agent is a peroxide.

3. The method of claim 2 wherein the source of the peroxide is selected from the group consisting hydrogen peroxide, sodium peroxide and calcium peroxide.

4. The method of claim 3 wherein the source of the peroxide is hydrogen peroxide.

5. The method of claim 1 further comprising stabilizing said source of the oxidizing agent.

6. The method of claim 5 comprising stabilizing the source of the peroxide with a stabilizer selected from the group consisting of acids, salts, and mixtures thereof.

7. The method of claim 6 wherein the stabilizer is selected from the group consisting of phosphoric acid, monopotassium phosphate and combinations thereof.

8. The method of claim 1 comprising alternately adding the source of the oxidizing agent and the aqueous catalyst solution to the in situ environment.

9. The method of claim 8 wherein the aqueous catalyst solution is first added to the in situ followed by source of the oxidizing agent.

10. The method of claim 8 wherein source of the oxidizing agent is first added followed by said aqueous catalyst solution.

11. The method of claim 1 comprising continuously adding the oxidizing agent and the aqueous catalyst solution to the in situ environment.

12. The method of claim 11 wherein the aqueous catalyst solution is first added to the in situ environment followed by source of the oxidizing agent.

13. The method of claim 11 wherein source of the oxidizing agent is first added to the in situ environment followed by said aqueous catalyst solution.

14. The method of claim 1 wherein the in situ environment comprises at least one of soils and groundwater with moderate to high permeability.

15. The method of claim 1 wherein the in situ environment comprises at least one of soils and groundwater with low to moderate permeability.

16. The method of claim 1 wherein at least a portion of the oxidizing agent comprises hydroxyl radicals.

17. The method of claim 1 wherein the in situ environment is selected from the group consisting of soil, groundwater, and fractured bedrock.

18. The method of claim 17 further comprising adding the source of the oxidizing agent and the aqueous catalyst solution to a region within the in situ environment known as the capillary fringe.

19. The method of claim 18 wherein the contaminants to be treated are less dense than water.

20. The method of claim 17 further comprising adding the source of the oxidizing agent and the aqueous catalyst solution to a region of the in situ environment comprising lower layers of a saturated zone.

21. The method of claim 20 wherein the contaminants are denser than water.

22. The method of claim 20 further comprising adding the source of the oxidizing agent and the aqueous catalyst solution to the lower layers of the saturated zone at different depths when the depth of the lower layer of the saturated zone is greater than 20 feet.

23. The method of claim 22 further comprising adding multiple doses of the source of the oxidizing agent and the aqueous catalyst solution.

24. The method of claim 23 wherein the difference in depth of each dose of said multiple doses is in the range of from about 5–10 feet.

25. The method of claim 1 wherein the steps of adding the source of the oxidizing agent and the aqueous catalyst solution are made at an elevated pressure.

26. The method of claim 25 wherein the elevated pressure is from about 20 to 100 psi.

27. The method of claim 25 wherein the in situ environment is fractured bedrock.

28. The method of claim 1 wherein the source of oxidizing agent is peroxide in water at concentration of up to 35% by weight.

29. The method of claim 28 wherein the concentration of the source of the oxidizing agent is less than 10%.

30. The method of claim 1 wherein the step of maintaining the pH of the aqueous catalyst solution comprises adding a pH modifying agent to the aqueous catalyst solution.

31. The method of claim 30 wherein the pH modifying agent is selected from water and a base.

* * * * *